C. S. MEISENHELTER.
ICE CREAM FREEZER.
APPLICATION FILED FEB. 28, 1913.

1,113,807.

Patented Oct. 13, 1914.
4 SHEETS—SHEET 1.

Witnesses
E. P. Ruppert.

Inventor
C. S. Meisenhelter
By Victor J. Evans
Attorney

C. S. MEISENHELTER.
ICE CREAM FREEZER.
APPLICATION FILED FEB. 28, 1913.

1,113,807.

Patented Oct. 13, 1914.
4 SHEETS—SHEET 2.

Witnesses
E. R. Ruppert
Wm Bangu

Inventor
C. S. Meisenhelter
By Victor J. Evans
Attorney

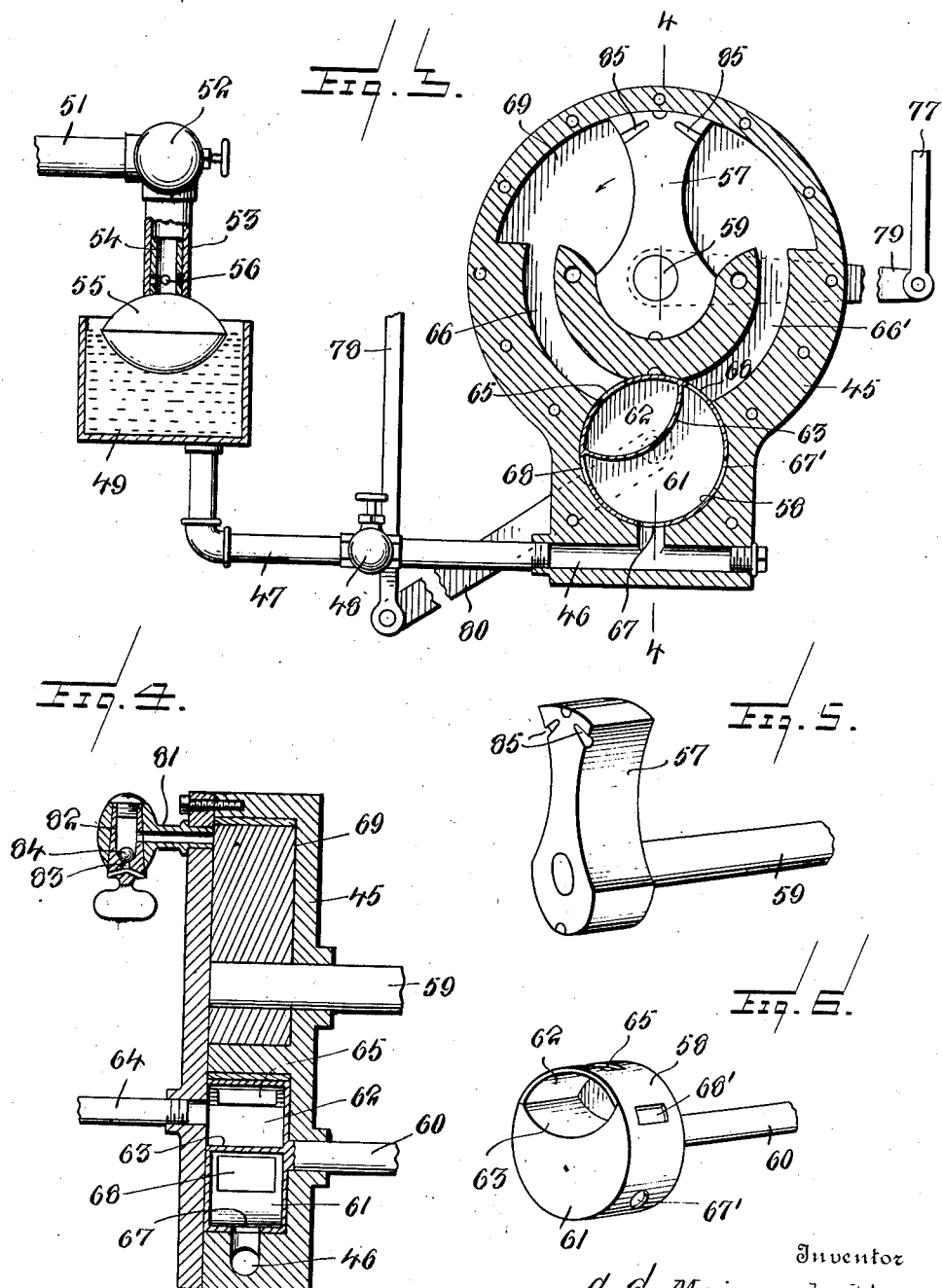

C. S. MEISENHELTER.
ICE CREAM FREEZER.
APPLICATION FILED FEB. 28, 1913.
1,113,807.
Patented Oct. 13, 1914.
4 SHEETS—SHEET 4.
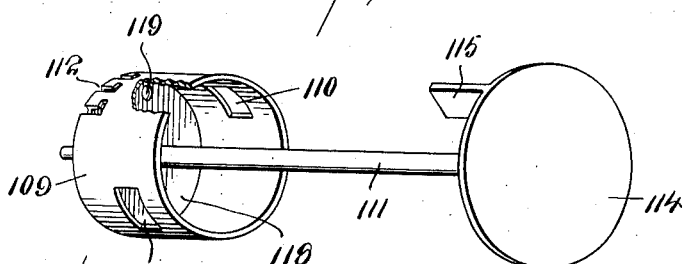
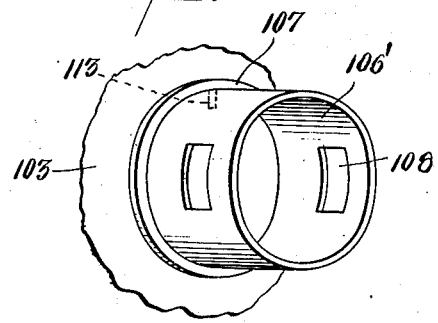
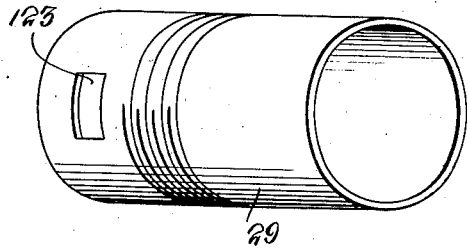
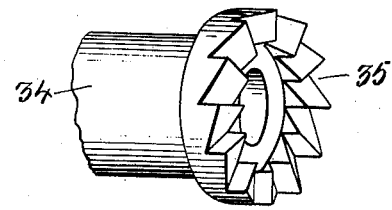
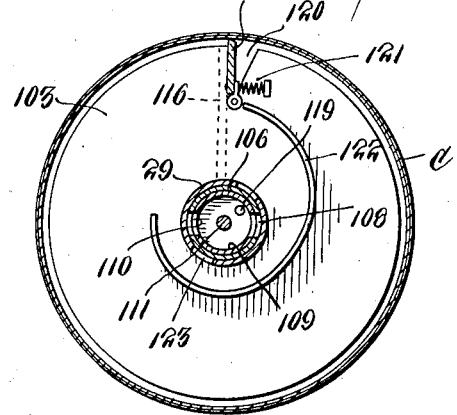
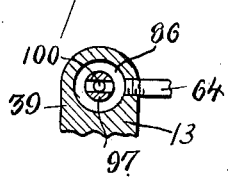
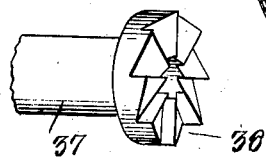
Inventor
C. S. Meisenhelter
By Victor J. Evans
Attorney
Witnesses

UNITED STATES PATENT OFFICE.

CHRISPIN S. MEISENHELTER, OF YORK, PENNSYLVANIA, ASSIGNOR TO GUSTUS MEISENHELTER, OF YORK, PENNSYLVANIA.

ICE-CREAM FREEZER.

1,113,807.  Specification of Letters Patent.  Patented Oct. 13, 1914.

Application filed February 28, 1913. Serial No. 751,356.

*To all whom it may concern:*

Be it known that I, CHRISPIN S. MEISENHELTER, a citizen of the United States, residing at York, in the county of York and State of Pennsylvania, have invented new and useful Improvements in Ice-Cream Freezers, of which the following is a specification.

This invention relates to ice cream freezers, and it has particular reference to automatic ice cream freezers of that class or type which are constantly supplied with cream prepared for freezing, the frozen cream being automatically discharged by the machine.

One object of the present invention is to simplify and improve the means for supplying cream to the freezer.

A further object of the invention is to simplify and improve the general structure and assemblage of parts constituting the freezer and the means for operating the same.

A still further object of the invention is to produce simple and effective means whereby the escape of frozen cream may be obstructed and regulated.

With these and other ends in view which will readily appear as the nature of the invention is better understood, the same consists in the improved construction and novel arrangement and combination of parts which will be hereinafter fully described and claimed.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

Figure 1:
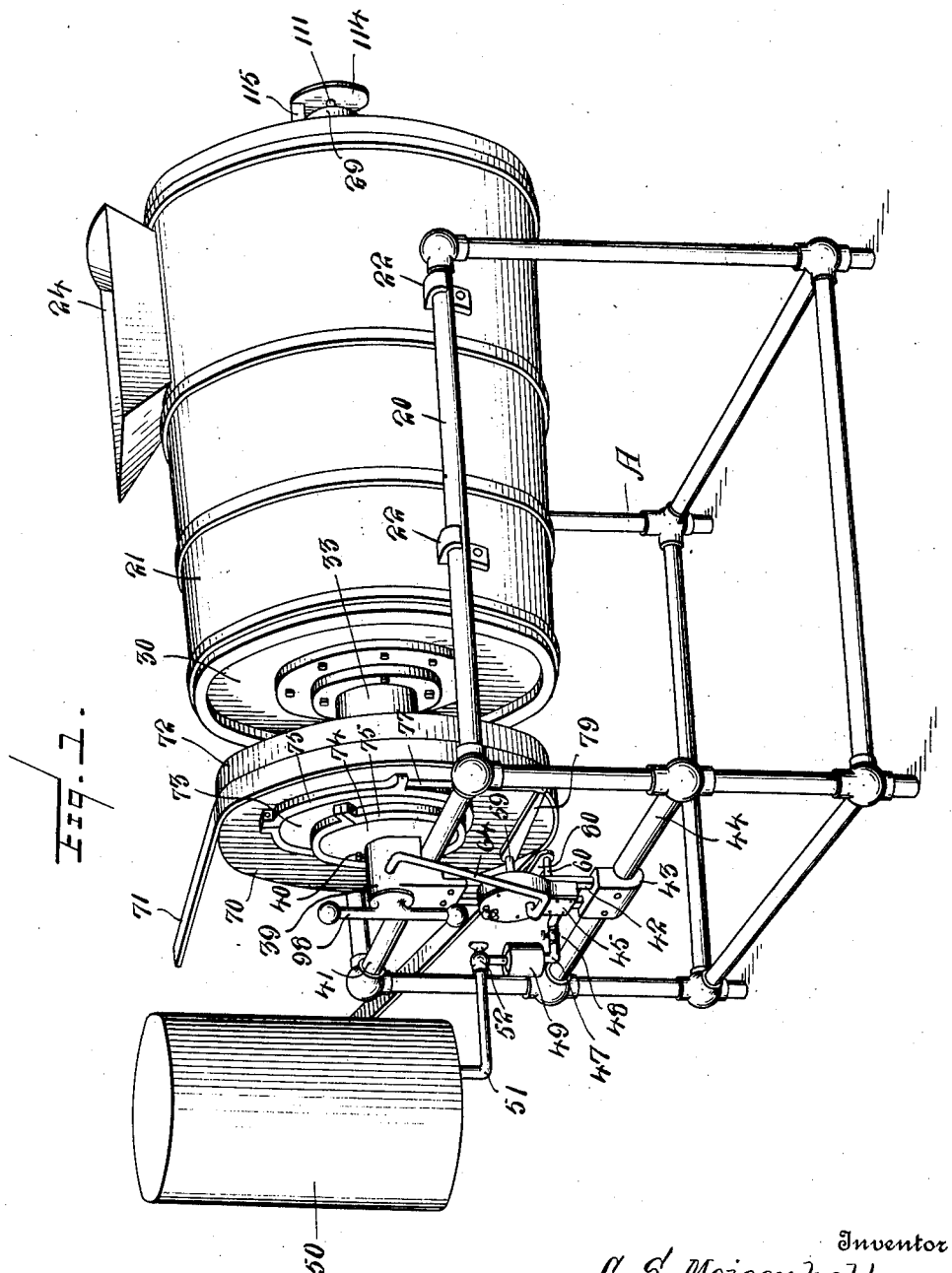
Figure 2:
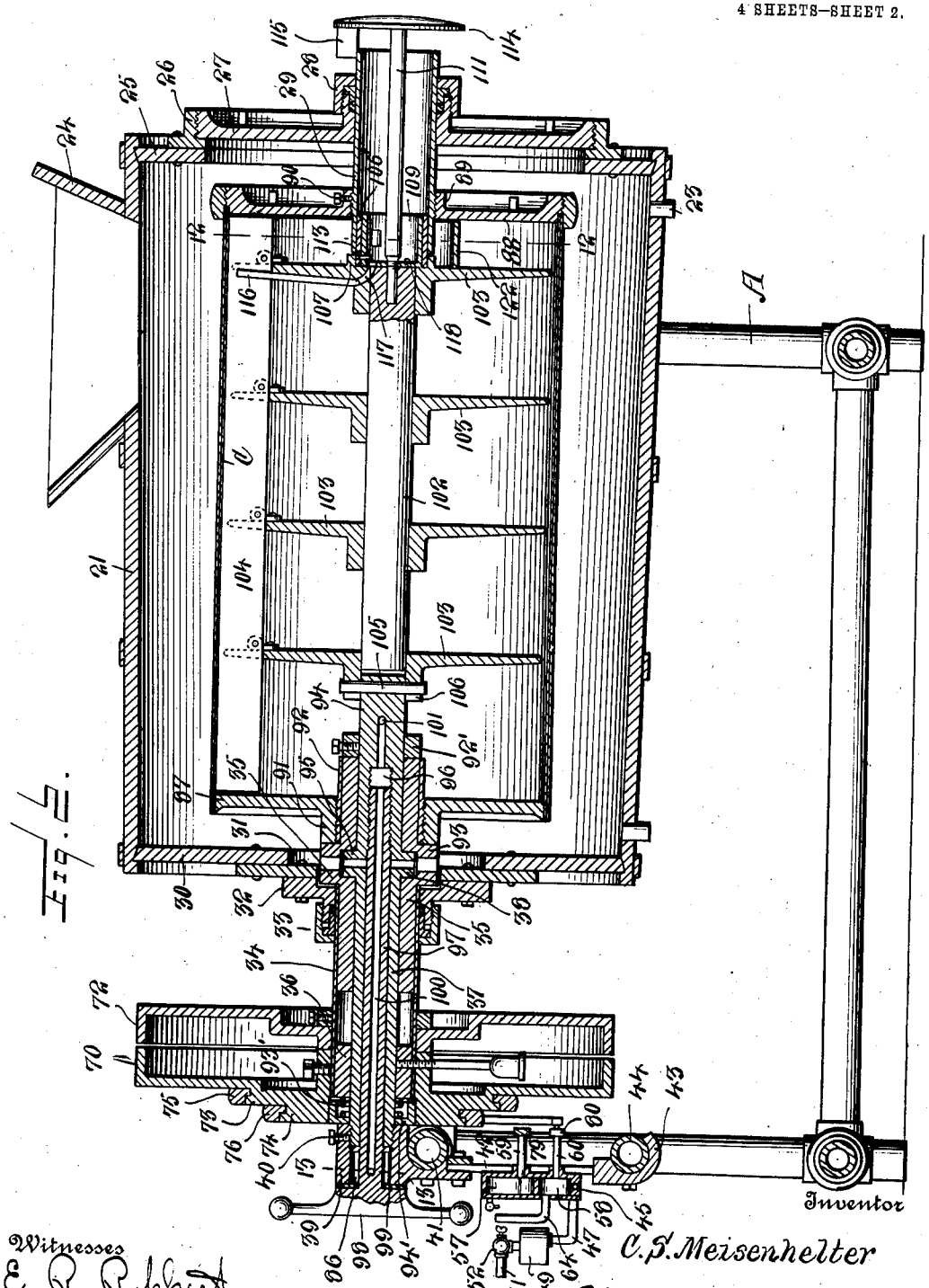

In the drawings,—Figure 1 is a perspective view of a machine embodying the invention. Fig. 2 is a longitudinal vertical sectional view of the same. Fig. 3 is a detail front elevation showing the pump or compressor with the front plate of its casing removed, and showing also the means for governing and regulating the cream supply partly in section. Fig. 4 is a vertical sectional view taken on the line 4—4 in Fig. 3, but showing the front plate in position on the pump casing, and showing also the air inlet connected with said front plate. Fig. 5 is a perspective detail view of the oscillatory pump piston detached. Fig. 6 is a perspective detail view of the oscillatory valve for directing the flow of cream through the pump. Fig. 7 is a perspective detail view, showing the adjustable member for governing the escape of frozen cream from the freezer. Fig. 8 is a perspective detail view of the stationary member coöperating with said movable member. Fig. 9 is a perspective detail view of the bearing sleeve of the freezer can surrounding the stationary member of the regulating device. Fig. 10 is a perspective detail view of one member of the exterior connecting clutch for connecting the rotary freezer can with the operating means. Fig. 11 is a perspective detail view, showing one member of the interior connecting clutch for connecting the stationary scraper with the holding means. Fig. 12 is a sectional detail view taken on the line 12—12 in Fig. 2. Fig. 13 is a sectional detail view, enlarged, taken on the line 13—13 in Fig. 2.

Corresponding parts in the several figures are denoted by like characters of reference.

A suitable frame A is provided, the same having been shown as being constructed mainly of metallic tubing, although obviously any other material may be employed. The frame includes side rails 20 supporting the tub or casing 21, the latter being provided with brackets 22 engaging the side rails so as to form a firm support. The tub is shown as of circular cross section and of increasing diameter toward the tail end where it is provided with a discharge plug 23. The tub is also shown as constructed with a hopper or chute 24, through which the freezing medium may be supplied. It is to be understood, however, that no restriction is made with regard to the freezing medium employed, and that means may be provided for circulating such freezing medium through the tub. The tail end of the tub has a head 25 provided with a threaded collar 26 for the reception of a closure consisting of a disk 27 which may be readily detached when the machine is to be disassembled for cleaning or other purposes, said disk or closure being provided with a packing box 28 that constitutes a bearing for a bearing sleeve 29 which is associated with the freezer can C, as will be hereinafter more fully described. The front end of the tub has a head 30 provided with a central aperture 31 which is surrounded by a collar 32 having a packing box 33 for the passage of a bearing sleeve 34 having at its rear end a clutch member 35. Under the construction shown more particularly in Fig. 2 of the drawings, the bearing sleeve 34 is constructed of steel tubing which may be shrunk upon or otherwise connected with the clutch member 35, which latter may be made of cast iron or other suitable material. Said steel tubing is also provided at its front end with an internal collar 36 upon which it may be shrunk or with which it may be otherwise suitably connected. It will be understood, however, that the sleeve or tube 34, the clutch member 35 and the collar 36 are to all intents and purposes integral with each other, said parts combining to constitute a sleeve having an axial bore and provided with a clutch member at its rear end. In the following description the collar 36 will be regarded as part of the sleeve.

Extending through the bore of the sleeve 34 is a tube 37 having at its rear end a clutch member 38 which is socketed in the face of the clutch member 35, which latter is freely revoluble with respect to the clutch member 38; the sleeve 34 being revoluble about the tube 37. The forward end of the tube 37 is firmly supported in a frog 39 with which it may have threaded connection and with respect to which it may be additionally secured by a set screw 40. The frog 39 is firmly supported and secured upon the top front rail 41 of the frame A, said frog being connected by brace rods 42 with a clip 43 secured upon a front rail 44 of the frame, as shown. It will be remembered that the tub 21 is firmly supported on the frame. The sleeve 34 is fitted revolubly in the bearing formed by the packing box 33, and an additional support for said revoluble sleeve is formed by the relatively stationary tube 37.

Supported on the brace rods 42 is the casing 45 of a pump compressor best shown in Figs. 3 and 4 of the drawings, said casing having an inlet 46 which is connected by a tube 47 having a cut-off valve 48 with a cup 49 which constitutes a feed vessel. Said feed vessel is supplied with cream from a suitable source, such as a tank 50, through a tube or duct 51 having a cut-off valve 52, the casing of which includes a vertical member 53 wherein is fitted the tubular stem 54 of a float 55 arranged in the feed cup 49, said float being adapted to constitute a closure for the lower end of the tube 53. The tubular stem 54 is provided a short distance above the float 55 with apertures 56 through which cream may pass from the source of supply to the cup or vessel 49 when the float is lowered. As the level of the cream rises in the feed cup 49, the apertures 56 of the tubular stem will rise within the surrounding tube 53, thereby coöperating with the float 55 to cut off the flow of cream. Overflow and waste of cream will thus be automatically prevented when for any reason the machine ceases to work, thereby dispensing with the necessity for constant supervision.

The pump or compressor casing 45 contains an oscillatory piston 57 and an oscillatory valve 58, the former being mounted on a shaft 59 and the latter on a stem 60. The valve, which is of cylindrical shape, is housed in the lower part of the casing, and said valve which is substantially composed of a hollow structure contains two compartments 61 and 62 which are separated by an arcuate partition 63. The upper compartment, the front of which is open, is in constant communication through said open front with the outlet duct 64 that extends through the front of the casing, see Figs. 1, 2 and 4. Said compartment 62 also communicates through a port or aperture 65 in the top wall thereof with passages 66, 66' that extend through the body of the pump casing and communicate with the interior of the latter at opposite sides of the piston 57, it being obvious that the port 65 will alternately communicate with the passages 66 and 66' at the limits of the movement of the oscillatory valve. The compartment 61 of the valve is provided with ports 67, 67' which will alternately communicate with the inlet 46 and with ports 68, 68' which will alternately communicate with the passages 66, 66', the ports of the compartment 61 which are not in communication with the inlet 46 or with one of the passages 66 or 66' being obstructed by the walls of the casing wherein the valve is housed, as will be readily seen by reference to Fig. 3. The piston 57 is an ordinary oscillatory piston which rocks or operates in the compartment 69 of the casing 45 and which, by its operation, will set up suction in the passages 66 and 66' alternately.

The sleeve 34 carries a fixed pulley 70 whereby it may receive motion from a source of power through the medium of a belt 71; said sleeve also carries a loose pulley 72 to which the belt may be transferred when the operation is to be suspended. Associated with the fixed pulley 70 are eccentric disks 73 and 74 having eccentric bands 75, 76 which are connected by links or rods 77, 78 with cranks 79, 80 that extend, respectively, from the piston carrying shaft 59 and from the valve stem 60, the parts being constructed and assembled in such a manner that the piston and the valve will be properly operated and timed.

The pump casing is provided in the front and near the top thereof with an air inlet 81 controlled by a turn cock 82 having an inlet passage 83 which is normally obstructed by a ball or other valve 84 seated by gravity so as to obstruct the passage 83, which latter, when the valve 84 is unseated will communicate with the inlet 81. The latter may be positively obstructed when desired by closing the turn cock 82. It is obvious that on each suction stroke of the piston 57, the latter will operate to unseat the valve 84, thus causing air to enter through the inlet 81, the air being incorporated with the cream which is drawn into the pump casing by such suction stroke. The compression stroke of the piston serves to expel the commingled air and cream through one of the passages 66, 66', valve compartment 62 and outlet 64. The front face of the piston 57 is provided with grooves 85 extending from the side edges thereof in the direction of the medial portion for the purpose of accelerating the unseating of the valve 84 or causing such unseating to take place at an earlier moment than would otherwise be the case when the piston is in operation.

The outlet duct 64 of the pump casing communicates with the frog 39 which contains a chamber 86, see Figs. 2 and 13, into which cream and air will be delivered by each pulsation of the piston. From the chamber 86 the cream is conducted to the freezer can C, as will be presently more fully described.

The freezer can C is a cylindrical vessel preferably constructed mainly of sheet metal and having at the front end thereof a stationary head 87 and at its tail end a removable head or closure 88. The removable head or closure 88 has a central aperture surrounded by a flange 89 which is seated on the bearing sleeve 29 on which it is secured by a set screw 90. The stationary head 87 has a central aperture surrounded by a flange 91 which is threaded for the reception of a sleeve 92 with which is associated a clutch member 93, said sleeve being preferably made of steel to provide strength for the clutch member which may be made of brass and which includes a tubular shank on which the sleeve 92 is shrunk or otherwise secured. Extending through the bore of the clutch member 93 is a shaft 94 having a clutch member 95 which is socketed in the face of the clutch member 93. The latter, which is fixedly associated with the freezer can is adapted to engage the clutch member 35 of the sleeve 34, which latter is supported for rotation, as described and which through interengagement of the clutch members 35, 93 will operate to rotate the can. The shaft 94 by interengagement of the clutch members 95 and 38 is held securely against rotation when the parts of the machine are assembled.

The shaft 94 is provided with a socket 96 which is internally threaded for the recep-tion of the correspondingly threaded end of a connecting member 97 having at its front or outer end a handle 98 abutting on the frog 39, a washer 99 being interposed. The connecting member has a bore 100 communicating at one end with the chamber 86 and at the other end with the interior of the freezer can through an aperture 101 in the shaft 94, thus constituting a duct through which the cream and air coming from the pump or compressor will be fed to the interior of the freezer can.

The axial shaft member 94 is provided with a collar 92' which, when said shaft member is drawn in an outward direction by the action of the threaded connecting member 97, will abut on the sleeve 92 carrying the clutch member 93, drawing the latter and related parts in an outward direction and placing the clutch member 93 into engagement with the clutch member 35, and likewise placing the clutch member 95 in engagement with the clutch member 38. The interlocking of the clutch members causes pressure to be exerted endwise upon the revoluble sleeve 34, said pressure being taken up by a spring 93' which is coiled about the stationary tubular member 37, said spring being accommodated within a cup-shaped washer 94' that is seated in a suitable recess in that portion of the fixed pulley 70 which is enlarged to form the eccentrics 73, 74. This spring will operate to hold the parts of the device tightly together when the said parts are assembled and to prevent leakage caused by wear.

102 is a shaft extending axially through the freezer can, said shaft carrying a plurality of disks 103 of a diameter slightly less than the internal diameter of the can, said disks serving to support a scraper 104 which is arranged above the shaft. The latter is detachably connected with the stationary shaft 94 by means of a key 105 engaging notches 106 in the hub of one of the disks 103, thus forming a slip joint which permits the shaft 102 with its related parts to be removed endwise from the can when the detachable head 88 is removed. Connected with the shaft 102 at the tail end thereof is a short sleeve 106' which has been shown as being secured to a flange 107 on one of the disks 103. The sleeve 106 which is thus held stationary, extends within the revolving bearing sleeve 29. The sleeve 106', as clearly seen in Fig. 8 of the drawings, is provided with slots or openings 108 through which frozen cream may escape. For the purpose of varying the area of the escape openings or entirely obstructing the same, as may be required at various stages of the operation, a cup 109 is provided, said cup being of cylindrical shape, and said cup being fitted revolubly within the sleeve 106 and provided with slots 110 which by axial rotation of the cup may be placed into or out of registry with the slots 108, thereby varying the area of the escape openings. The cup 109 is carried by a stem 111, and said cup is provided with bayonet slots 112 adapted for engagement with a pin 113 which may be fixed in any convenient position, for example, by attaching it to the flange 107 and permitting it to extend through the stationary sleeve 106'. The stem 111 carries at its rear end a cap 114 which is spaced from the rear end of the sleeve 29, and it constitutes a handle whereby the stem may be manipulated for the purpose of properly adjusting the regulating cup 109. The cap 114 carries a deflector 115, whereby the frozen cream as it escapes from the machine may be deflected downwardly into a suitable receptacle placed underneath.

A tubular air duct 116 which is secured on the rearmost disk 103 and which extends upwardly within the can, communicates at its lower end with a duct or aperture 117 extending through the disk and the shaft 102 on which it is mounted, said duct being obstructed by the bottom or inner end wall 118 of the cup 109 when the apertures 108 and 110 are positioned in such relation as to permit frozen cream to escape therethrough. When the cup 109 is adjusted in such fashion as to place the apertures 110 and 108 out of registry, thus obstructing the escape of the cream entirely, the duct 117 may register with an aperture 119 in the end wall or bottom member 118 of the cup 109, thereby permitting air to escape from the interior of the freezer can.

The scraper 104 is preferably connected pivotally with the disks 103, each of the latter being provided with a notch 120 to permit the scraper to have a limited swinging movement for the purpose of permitting it to yield slightly to the pressure of frozen cream on the inner face of the wall of the freezer can; said scraper is actuated by means of springs, one of which appears in Fig. 12 at 121, whereby it is sustained normally in an upright engaging position with respect to the freezer can.

The rearmost disk 103 is provided with a spirally disposed flange or shelf 122 extending between said disk and the removable head 88 of the can. This shelf receives the frozen cream that is being elevated by the rotary motion of the can and detached by the scraper 104 adjacent to the tail end of the can. The bearing sleeve 29 which is connected with the freezer can for rotation therewith is provided with slots or apertures 123 through which the frozen cream may escape as it is being forced out through the slots 108, 110, the cream being shaved off as it emerges through the last named slots by engagement with the end walls of the slots 123. It then passes out through the sleeve 29 and escapes through the space between the sleeve and the cap 114, being deflected downwardly by the flange 115.

In the operation of this invention motion may be transmitted from any suitable source of power by means of the fixed pulley 70 to the sleeve 34 with which the freezer can is connected by the interengaging clutch members 93, 35, thereby causing the can C to rotate within the tub containing the freezing medium. Cream and air will be fed by the pump or compressor through the chamber 86 in the frog 13 and through the duct 100 and aperture 101 to the interior of the freezer can near the front end of the latter. As the latter rotates the congealed cream gradually travels toward the tail end of the can through the annular spaces between the disks 103 and the wall of the can, the frozen cream being detached from the wall of the can by the scraper 104. The movement of the cream in the direction of the tail end of the can is assisted and accelerated by the air pressure which will gradually develop within the can, the air being injected forcibly by means of the pump, as described. During the early stage of the operation, the escape apertures 108 may be obstructed by the walls of the cup 109, and the air outlet 117 may be likewise obstructed by the bottom wall of the cup until the requisite pressure has been developed, when the cup may be adjusted in in such a manner as to permit air to escape through the tube 116 and duct 117. This will relieve the internal air pressure to a sufficient extent to prevent interference with the operation of the pump or danger to the can or container.

When the operation has progressed sufficiently, the cup 109 is adjusted to open the outlet, and the cream will now be forced through the apertures 108, the frozen cream at the tail end of the can being lifted by the rotation of the can, detached by the scraper 104 and caused to drop on the shelf 122, from which it is forced through the apertures by the internal air pressure within the can, the escape of the frozen cream being assisted and facilitated by the apertures 123 in the bearing sleeve 29, which latter is revolubly connected with the can, causing the frozen cream to be detached by the end walls of the apertures 123 as it is forced through the latter when they pass into registry with the slots 108. The operation, when started, may be continued indefinitely by keeping up the supply of cream and by maintaining the freezing medium within the tub.

The construction, it will be seen, is such as to provide tight and leak proof joints between the freezer can and the interior of the tub, and also of such a nature as to enable the parts of the machine to be readily assembled or disassembled, as occasion may require.

Having thus described the invention, what is claimed as new, is:—

1. In an ice cream freezer, a frame, a stationary tub supported on the frame, a frog supported on the frame, a revoluble sleeve extending through the head of the tub and having a clutch member, a freezer can supported for rotation within the tub and having a coöperating clutch member, a stationary tubular member supported by the frog and having a clutch member at its inner end, a shaft member, axial with respect to the freezer can, and extending through the clutch member associated with the freezer can, said shaft member having a clutch member coöperating with the clutch member on the stationary tubular member, and a connecting member threaded into the axial shaft member and bearing externally on the frog to form a closure for the chamber of the latter.

2. In an ice cream freezer, a frame, a stationary tub supported on the frame, a frog supported on the frame, a revoluble sleeve extending through the head of the tub and having a clutch member, a freezer can supported for rotation within the tub and having a coöperating clutch member, a stationary tubular member supported by the frog and having a clutch member at its inner end, a shaft member, axial with respect to the freezer can, and extending through the clutch member associated with the freezer can, said shaft member having a clutch member coöperating with the clutch member on the stationary tubular member, and a connecting member threaded into the axial shaft member and bearing externally on the frog to form a closure for the chamber of the latter; an obstructing collar on the axial shaft member adapted to engage the inner end of the clutch member associated with the freezer can, and a spring interposed between the frog and the revoluble sleeve.

3. In an ice cream freezer, the combination with suitable supporting means, of a revoluble sleeve, a freezer can mounted for rotation, coöperating clutch members associated with the sleeve and with the freezer can, a stationary tubular member extending through the revoluble sleeve, a stationary shaft axial with respect to the freezer can and extending through the clutch member associated with the latter, coöperating clutch members on the axial shaft and the stationary tubular member, a connecting member extending through the stationary tubular member and having threaded engagement with the axial shaft, said connecting member having a duct extending therethrough and communicating through the axial shaft with the interior of the freezer can, and means for forcing cream under pressure through the duct of the connecting member.

4. In an ice cream freezer, the combination with supporting means including a frame, a tub supported on the frame and a frog mounted on the frame, of a freezer can mounted for rotation within the tub and having a clutch member, a revoluble driven sleeve having a clutch member coöperating with the clutch member of the can, a stationary tubular member connected with the frog and extending through the revoluble sleeve, a shaft member axial with relation to the freezer can, coöperating clutch members on the axial shaft and on the stationary tubular member, a connecting member extending through the stationary tubular member and having threaded connection with the axial shaft, said connecting member having a duct and said axial shaft having an aperture through which said duct communicates with the interior of the can, and a handle on the connecting member abutting on the frog.

5. In an ice cream freezer, the combination with supporting means including a frame, a tub supported on the frame and a frog mounted on the frame, of a freezer can mounted for rotation within the tub and having a clutch member, a revoluble driven sleeve having a clutch member coöperating with the clutch member of the can, a stationary tubular member connected with the frog and extending through the revoluble sleeve, a shaft member axial with relation to the freezer can, coöperating clutch members on the axial shaft and on the stationary tubular member, a connecting member extending through the stationary tubular member and having threaded connection with the axial shaft, said connecting member having a duct, and said axial shaft having an aperture through which said duct communicates with the interior of the can, a handle on the connecting member abutting on the frog, a stationary collar on the axial shaft member, which latter extends through the clutch member of the freezer can, and a spring interposed between the revoluble sleeve and the frog.

6. In an ice cream freezer, a rotary driven member, a rotary freezer can, clutch members affording connection between the rotary driven member and the freezer can, a stationary tubular member extending through the rotary driven member, a stationary shaft axial with respect to the freezer can, coöperating clutch members on the stationary tubular member and the axial shaft, means for drawing the axial shaft in the direction of the stationary tubular member to place the clutch members in engagement, supporting means for the stationary tubular member, and a spring interposed between the supporting means and the revoluble driven sleeve.

7. In an ice cream freezer, a revoluble driven sleeve, a freezer can supported for rotation, interengaging clutch members on the sleeve and the freezer can, a stationary tubular member extending through the driven sleeve, a shaft axial with respect to the freezer can and extending through the clutch member of the latter, interengaging clutch members on the axial shaft and the stationary tubular member, a frog supporting the stationary tubular member, a connecting member extending through the frog and the stationary tubular member and having threaded engagement with the axial shaft, a handle on the connecting member abutting on the frog, a duct extending through the connecting member, an aperture in the axial shaft through which said duct communicates with the interior of the can, and means for injecting cream through the duct into the can.

8. In an ice cream freezer, a revoluble driven sleeve, a freezer can supported for rotation, interengaging clutch members on the sleeve and the can, non-revoluble members extending through the clutch members of the sleeve and the can and having interlocking clutch members, and means for effecting movement of the non-revoluble member extending through the clutch member of the can to place its clutch member into or out of engagement with the clutch member of the non-revoluble member extending through the clutch member of the revoluble sleeve.

9. In an ice cream freezer, a revoluble driven sleeve, a freezer can supported for rotation, interengaging clutch members on the sleeve and the can, non-revoluble members extending through the clutch members of the sleeve and the can and having interlocking clutch members, means for effecting movement of the non-revoluble member extending through the clutch member of the can to place its clutch member into or out of engagement with the clutch member of the non-revoluble member extending through the clutch member of the revoluble sleeve, and a scraper carrying shaft detachably associated with the non-revoluble member extending through the clutch member of the can.

10. In an ice cream freezer, a revoluble freezer can, a relatively stationary shaft extending axially therethrough, disks on said shaft, a scraper carried by the disks, a stationary member extending through the head of the can and with which the scraper carrying shaft is detachably connected, said shaft having an aperture communicating with the interior of the can, a cream duct connected with the apertured member, and means for forcing cream under pressure through the duct into the can.

11. In an ice cream freezer of the character described, a revolubly supported freezer can including an axial discharge sleeve having apertures, a relatively stationary scraper carrying shaft, a sleeve connected with the latter, said sleeve extending within the discharge sleeve and having apertures coöperating with the apertures in the discharge sleeve to permit the escape of frozen cream, a cup-shaped member within the sleeve associated with the scraper carrying shaft and having apertures, and means for adjusting the cup-shaped member with respect to the sleeve to vary the area of the discharge apertures, and for securing the sleeve in adjusted position.

12. An ice cream freezer of the character described including a revoluble freezer can having a discharge sleeve, a relatively stationary scraper carrying shaft, a sleeve associated with the latter and extending within the discharge sleeve, said stationary sleeve being provided with apertures, a cup-shaped member supported within the stationary sleeve and having apertures, means for adjusting the cup-shaped member within the stationary sleeve to vary the area of the apertures, said adjusting means including a stem extending axially through the sleeve associated with the revoluble can and having a cap spaced from the discharge end of said sleeve and a deflector mounted on the cap, and means for securing the cup-shaped member at various adjustments; the sleeve associated with the revoluble can being provided with apertures alternately registering with and obstructing the apertures of the stationary sleeve.

13. In an ice cream freezer of the character described, a revoluble freezer can having a discharge sleeve, means for regulating the escape of frozen cream through said sleeve and for obstructing such escape, an air duct connecting the interior of the freezer can with the sleeve or outlet, and means for obstructing the air outlet when the cream escape is unobstructed, and vice versa.

In testimony whereof I affix my signature in presence of two witnesses.

CHRISPIN S. MEISENHELTER.

Witnesses:
HARRY STATHOPULOR.
F. ELLA WILT.